(12) United States Patent
Dantou et al.

(10) Patent No.: US 8,656,593 B2
(45) Date of Patent: Feb. 25, 2014

(54) METHOD FOR ASSEMBLING A PART OF A METAL MATERIAL AND A PART OF A COMPOSITE MATERIAL USING A FASTENER

(75) Inventors: Nicolas Dantou, Colomiers (FR); Stephane Bianco, Toulouse (FR); Christian Godenzi, Colomiers (FR)

(73) Assignee: Airbus Operations (S.A.S.), Toulouse (FR)

( * ) Notice: Subject to any disclaimer, the term of this patent is extended or adjusted under 35 U.S.C. 154(b) by 999 days.

(21) Appl. No.: 12/598,005

(22) PCT Filed: May 6, 2008

(86) PCT No.: PCT/FR2008/050792
§ 371 (c)(1),
(2), (4) Date: Apr. 2, 2010

(87) PCT Pub. No.: WO2008/148993
PCT Pub. Date: Dec. 11, 2008

(65) Prior Publication Data
US 2010/0287776 A1 Nov. 18, 2010

(30) Foreign Application Priority Data

May 9, 2007 (FR) .................................... 07 54930

(51) Int. Cl.
*B21D 53/88* (2006.01)
(52) U.S. Cl.
USPC ... 29/897.2; 29/90.01; 29/243.53; 29/525.06; 29/592; 29/525.05; 403/282; 403/408.1; 72/334; 72/377; 72/327; 72/412
(58) Field of Classification Search
USPC ......... 29/90.01, 243.53, 243.54, 525.06, 897, 29/592, 897.2, 507, 525.05; 403/282, 403/408.1; 72/334, 377, 327, 412
See application file for complete search history.

(56) References Cited

U.S. PATENT DOCUMENTS

| | | | | |
|---|---|---|---|---|
| 4,129,028 A | * | 12/1978 | Leftheris et al. | 72/430 |
| 4,771,627 A | * | 9/1988 | Speakman | 72/479 |
| 6,266,991 B1 | | 7/2001 | Kuo | |
| 6,711,928 B1 | * | 3/2004 | Easterbrook | 72/334 |
| 2003/0024904 A1 | | 2/2003 | Clauer | |
| 2005/0220533 A1 | | 10/2005 | Prichard | |

FOREIGN PATENT DOCUMENTS

WO 2004/048073 A 6/2004

OTHER PUBLICATIONS

International Search Report dated Nov. 20, 2008.

* cited by examiner

*Primary Examiner* — Peter DungBa Vo
*Assistant Examiner* — Azm Parvez
(74) *Attorney, Agent, or Firm* — Jenkins, Wilson, Taylor & Hunt, P.A.

(57) ABSTRACT

A method for assembling a part of a metal material and a part of a composite material, the junction of the two parts being achieved through a fastener having a substantially constant section and received in a first hole formed in the part of a metal material and a second hole formed in the part of a composite material. According to the disclosed embodiments and before assembling the aforementioned parts, the method includes: an expansion step for generating a field of compression stresses at the periphery of the first hole and locally in the material constituting the part of a metal material using an expansion tool; a single boring step for making the first hole and the second hole with a diameter $\emptyset_{final}$ substantially larger than the diameter of the fastener in order to leave a gap between the inner walls of the holes and the outer surface of the fastener; and an assembling step for placing the fastener inside the holes for maintaining together the metal part and the composite part.

7 Claims, 3 Drawing Sheets

-- PRIOR ART --

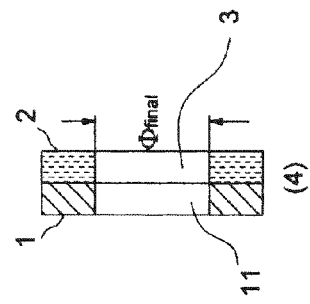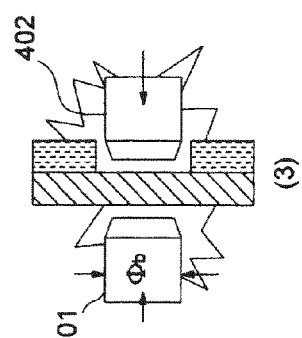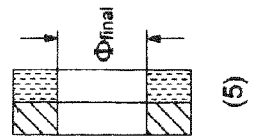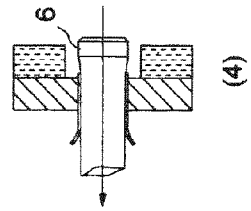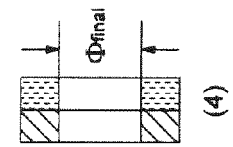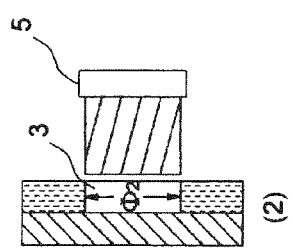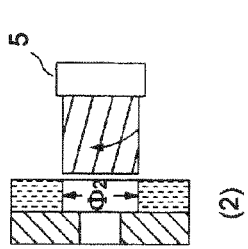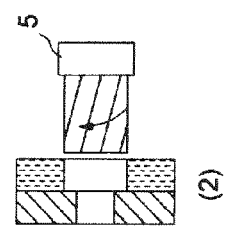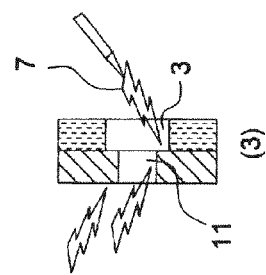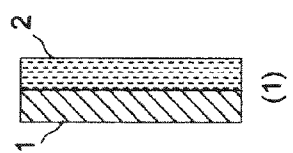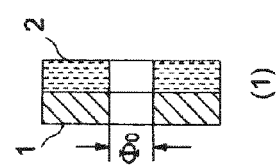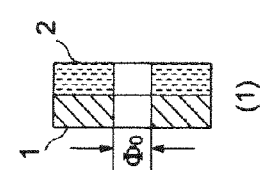
Fig.2
Fig.3
Fig.4

METHOD FOR ASSEMBLING A PART OF A METAL MATERIAL AND A PART OF A COMPOSITE MATERIAL USING A FASTENER

CROSS-REFERENCE TO RELATED APPLICATIONS

This application is the National Stage of International Application No. PCT/FR2008/050792 filed on 6 May 2008, which designated the United States of America, and which international application was published as Publication No. WO2008/148993, which claims priority to French Application No. 07 54930 filed on 9 May 2007, both of which are incorporated by reference in their entirety.

The disclosed embodiments concern a process for assembling a part made out of a metal material and a part made out of a composite material using a fastener with an approximately constant cross section that is held in a bore hole made for that purpose in the parts.

In general, the disclosed embodiments have applications when it is necessary to assemble at least one part made of a metal material and one part made of a composite material, particularly for assemblies subject to significant mechanical stresses. The invention has very special applications in the field of aeronautics, in which the assembly process can affect the fatigue life and the safety of aeronautic structures. The disclosed embodiments also have applications in the field of land vehicles, for assembling parts intended to form light structures.

BACKGROUND

In the rest of the description, the expressions "part made of metal material" and "part made of composite material" are called "metal part" and "composite part" respectively.

It is known how to use a process of bore expansion and interference-fit mounting on a fastener to increase the fatigue life in an assembly between two metal parts. These expansion and interference processes cause compressive stresses on the surface of the bore and locally in the material of which the part is composed. These stresses have the effect of slowing down the initiation and propagation of fatigue cracks in the immediate vicinity of the bore. The result is an increase in fatigue life. There are several expansion processes, and they can be used separately or in combination.

FIG. 1A shows a known so-called interference mounting process for assembling two metal parts that consists of making a bore hole in the two parts 1 having a diameter $\varnothing_{bore}$ less than a fastener diameter $\varnothing_{fastener}$ which is the diameter of the fastener rod 9. Inserting the fastener 9 in the bore generates compressive stresses on the periphery of the bore holes because the fastener diameter $\varnothing_{fastener}$ is greater than the bore diameter $\varnothing_{bore}$. The stresses created in this way make it possible to increase the fatigue life in these work areas, [which are] critical because of the initiation of cracks in areas with loads.

FIG. 1.B is a schematic view of another example of the known process of generating stresses locally on the surface of the bore in an assembly of metal parts. An expansion process is used with an expansion tool 6. The process includes the following steps:

(1) the first bore is made with a conventional boring tool 5 in the two metal parts; the diameter of the bore is chosen so that the diameter of the bore is adapted to the diameter of the expansion tool 6, i.e., the bore diameter $\varnothing_{bore}$ must be slightly less than the diameter of the expansion tool.

(2) next the expansion tool 6, a so-called burnisher, is passed through the bore made in step (1); this tool has an olive-shaped part with a diameter greater than that of the bore; its passage through the bore strain-hardens the bore and generates residual compressive stresses on the surface of the bore and locally in the material of the two parts.

(3) a final bore is made to adapt the diameter of the holes to the diameter of the fastener rod, and then the fastener is put on to hold the assembly of the two parts.

Parts made of composite material have exceptional properties in terms of resistance to mechanical fatigue and strong rigidity, while giving structures a very low weight. These parts are used especially in the aeronautics industry, including in structures with very heavy loads. However, assembling these composite parts poses specific problems compared to metal parts.

Indeed, the composite parts 2, as shown in FIG. 1.C, are comprised of structures obtained by stratification of fibers impregnated with resin, for example carbon fibers impregnated with an epoxy resin. Such a composite part has structural properties that are advantageous in the fiber strata plane, but sensitive to delamination phenomena in a direction perpendicular to the planes, i.e., in the direction of the bore used to put on the fastener.

The compressive forces exerted by the means of attachment can cause the phenomenon of delamination in the bore. In general, to prevent this delamination phenomenon, it is necessary to minimize the stresses that appear in the fastener area, that is, at the interface between the wall of the bore hole and the fastener. To do so, contrary to the case of a metal assembly, a bore with a diameter slightly greater than the diameter of the fastener 9 is generally made so as to leave enough play between the wall of the bore hole and the surface of the fastener 9 to prevent interference.

In aeronautic structures, the coexistence of metal and composite parts leads to frequent assembly of metal parts with composite parts. There can be junctions between two panels of different structures or local reinforcement, for example ribs, or metal stiffeners on a composite panel.

In such an assembly, either an assembly with play between the wall of the holes and a fastener is chosen, and the mount is then unfavorable to the metal part in terms of fatigue life, or interference-fit assembly is chosen and such mounting risks damaging the composite part.

One solution would be to make a hole in the metal part and in the composite part, which are two distinct parts, for the fastener, then generate a field of residual stresses in the metal part in the absence of the composite part, and then place the composite part against the metal part for assembly. This solution is not satisfactory, indeed in this case, it is necessary to predetermine precisely the positions of the holes so that they are aligned during assembly for the passage of the fastener. This alignment cannot be done industrially.

SUMMARY

This disclosed embodiments therefore seek to solve the problem of assembling a metal part and a composite part with a fastener without penalizing the fatigue life of the metal part and without damaging the composite part.

This disclosed embodiments proposes a process that makes it possible, in a general way, to generate solely a field of stresses on the periphery of the fastener hole for the metal part, and locally in the material of the metal part without interference with the composite part, while guaranteeing perfect alignment between the fastener holes for the two parts.

To this end, the subject matter of the disclosed embodiments is therefore a process for assembling a part made of a metal material and a part made of a composite material, with the junction between said parts made by means of a fastener with a cross section that is approximately constant that fits into a first hole made in the part made of metal material and a second hole made in the part made of composite material.

According to the disclosed embodiments, prior to assembling said parts, the process includes:

an expansion step to generate a field of compressive stresses on the periphery of said first hole and locally in the material of which the metal part is composed using an expansion tool, a single boring step to make said first hole and said second hole having a diameter Øfinal that is approximately greater than the diameter of the fastener so as to leave an interstice between the inner wall of said holes and the outer surface of the fastener, an assembly step to position the fastener in said holes to hold the metal part and the composite part together.

According to a first form of embodiment of the process in which the expansion step is carried out by striking a tool composed of two parts, the process includes the following steps:

place the metal part against the composite part, make said second hole in the part made of composite material having a diameter Ø2 approximately greater than the outer diameter Øb of said expansion tool, to allow the expansion tool to go through without generating any stresses on the periphery of said second hole, perform the expansion step in the metal part by applying the two parts of the tool on each side of the metal part on the surface of the metal part, with the ends of the two parts of the expansion tool placed facing, with one of the parts going through said second hole in the composite part so that the expanded area in the metal part is an area approximately facing the second hole, strike the two parts to generate the field of stresses in the area facing the second hole of the part made of composite material, perform the boring step in the expanded area and in said second hole to obtain a first hole and a second hole having the same diameter, the diameter Øfinal, perform the assembly step by positioning the fastener.

In a second form of embodiment of the process in which the expansion step is done with an expansion tool, a so-called burnisher, the process includes the following steps:

place the metal part against the composite part, make said second hole in the part made of composite material having a diameter Ø2 approximately greater than the outer diameter Øb of the expansion tool, in order to allow the expansion tool to pass without generating any stresses on the periphery of said second hole, make a first hole in the metal part facing said second hole, with said first hole having a diameter Ø1 approximately less than the diameter of the expansion tool, so that passing said tool into said hole generates the field of stresses on the periphery of the hole by exerting mechanical action due to strain-hardening on the internal wall of the hole, pass said tool into said holes, perform the boring step in said first expanded hole and in said second hole to obtain a first and second hole with the same diameter, diameter Øfinal.

perform the assembly step by positioning the fastener (9).

In a third form of embodiment of the process, in which the expansion step uses a laser beam as an expansion tool, said process includes the following steps:

place the metal part against the composite part, make said second hole in the part made of composite material with a diameter Ø2 approximately greater than the outer diameter Øb of the expansion tool, to permit the passage of the expansion tool without generating any stresses on the periphery of said second hole, make a first hole in the part made of metal material, with the diameter Ø1 of said hole being approximately less than the diameter Ø2 of the part made of composite material, perform the expansion step by sending a laser beam into said first hole on either side of the part made of metal material, with said beam having a diameter less than the diameter Ø2 of the hole in the composite part, with the sweeping of the laser beam on at least one part of the surface of the internal wall of the hole making it possible to exert a strain-hardening action in said hole, generating the field of stresses on the periphery of said first hole and locally in the material of which the metal part is composed, perform the boring step in said first expanded hole and in said second hole to obtain a first hole and a second hole with the same diameter, diameter Øfinal.

perform the assembly step by positioning the fastener.

In a fourth embodiment of the process in which the expansion step uses a punch as an expansion tool, said process includes the following steps:

punch the surface of the part made of metal material all over using said punch; said expanded area can be marked with the punch marks on the outer surface of the part made of metal material, place the part made of metal material against the part made of composite material, perform the single boring step in the direction of the metal part toward the composite part, by placing the end of the boring tool in the center of the expanded area marked on the surface of the part made of metal material, to obtain a first hole and a second hole with the same diameter, diameter Øfinal, with said first hole centered in relation to the field of stresses generated.

perform the assembly step by positioning the fastener in said holes.

The disclosed embodiments also concern the use of the process described above to manufacture an aircraft structure assembling at least one composite part and at least one metal part.

BRIEF DESCRIPTION OF THE DRAWINGS

The disclosed embodiments will be better understood by reading the following description and examining the figures accompanying it. The figures are presented for purposes of indication and in no way limit the disclosed embodiments. The figures show:

FIG. 2: an assembly process for a metal part and a composite part according to a first embodiment of the disclosed embodiments, FIG. 3: an assembly process for a metal part and a composite part according to a second embodiment of the disclosed embodiments, FIG. 4: an assembly process for a metal part and a composite part according to a third embodiment of the disclosed embodiments.

DETAILED DESCRIPTION

Figure 1A:
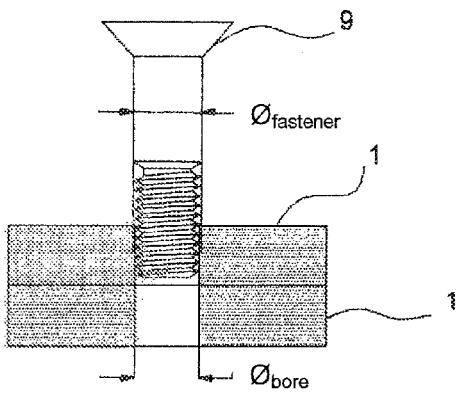
FIG. 1.A: a cross-section of an assembly between two metal parts according to the state of the art by a so-called interference-fit assembly process, FIG. 1.B: the different steps in an expansion process in an assembly of metal parts in the state of the art, FIG. 1.C: assembly of two composite parts in the state of the art.
Figure 1B:
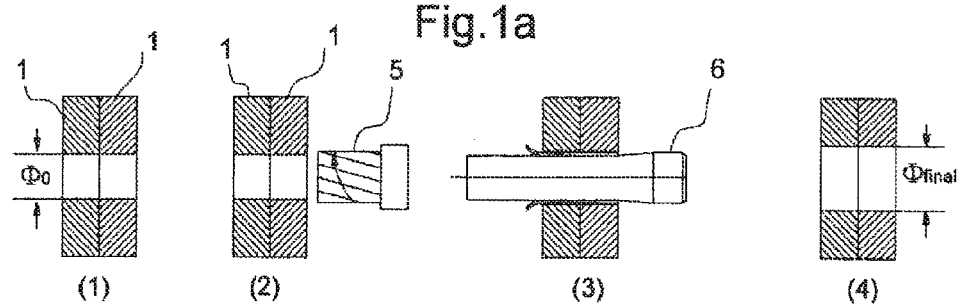
Figure 1C:
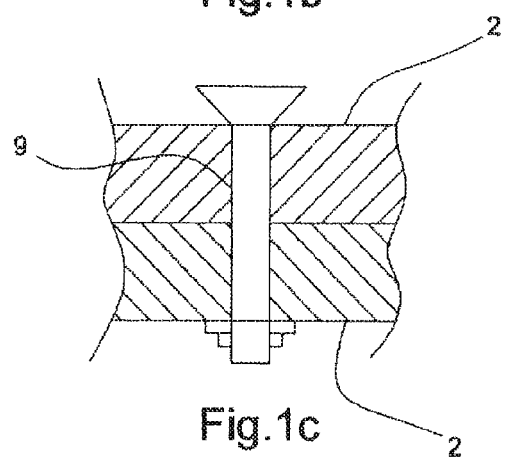

The process in this disclosed embodiments is applicable, in general, to assembling a metal part 1 and a composite part 2, which are distinct parts intended to be held against one another by means of a fastener positioned in a bore hole made in said parts.

The main concept in the disclosed embodiments is to be able to generate, prior to assembling the metal part and the composite part, a field of stresses on the surface of the bore in the metal part and locally in the material of which the metal part is composed in the immediate proximity of the bore by means of a process of expansion without damaging the composite part. The presence of these stresses makes it possible to increase the fatigue life in the metal part and to retard the propagation of cracks.

To do so, it is imperative that the step in the expansion process be done without interference with the composite part in order to avoid creating stresses in the volume of the composite part that would damage it.

Another objective of the disclosed embodiments is to obtain perfect alignment between the hole in the metal part and the hole in the composite part to position the fastener intended to hold the parts together and center the hole in the metal part in relation to the field of stresses generated.

FIGS. 2, 3, 4 and 5 show four forms of embodiment of the process in the disclosed embodiments that meet these objectives.

The metal part 1 can be made, for example, of an aluminum alloy, and the composite part 2 of a composite material containing fibers held by a resin, for example carbon fibers.

Generally, in the initial state, the two parts 1, 2, one or the other or both, have holes made by means of a conventional boring tool with a diameter $\varnothing_0$ later requiring a bore to be adapted to the different steps of the process in the disclosed embodiments.

In the rest of the description, to distinguish the holes made in the metal part and in the composite part, the hole in the metal part is designated by the expression "first hole" and the hole in the composite part by the expression "second hole."

FIG. 2 shows a cross section of an assembly for the metal part 1 and the composite part 2 in a first form of embodiment of the disclosed embodiments in which the metal part is subjected locally to an expansion process carried out by striking it.

The expansion tool here is composed of two parts 401, 402. The expansion process consist of striking the surface of the metal part by means of the two parts 401, 402. The strikes make it possible to generate locally a field of persistent stresses in the material of the metal part.

In the initial state (1), neither of the two parts has any holes.

In step (2), a second hole 3 is made in the composite part using a traditional boring tool 5. Said hole 3 is made with a specific diameter $\varnothing_2$, which should be greater than the outer diameter $\varnothing_b$ of an expansion tool, so that the expansion tool can pass through the second hole 3 without causing stress on the inside wall of the second hole 3.

In step three (3), the expansion is done by means of the two parts 401, 402 of the expansion tool by strikes, with the ends of said parts placed opposite each other, one of the two parts 402 of the tool going through the second hole 3 in the composite part 2, in an area facing the second hole 3, with the other part 401 positioned on the opposite side of the metal part facing the second hole 3. Thus, the position of the center of the expanded zone is determined by the second hole 3.

In step four (4), a final bore is made in the first hole 11 and the second hole 3, so that the diameters of the first hole and the second hole are equal; the first hole is potentially made through the second hole. This diameter $\varnothing_{final}$ is approximately greater than the diameter $\varnothing_{fastener}$ of a fastener 9 so as to leave an interstice between the wall of the holes 3, 11 and the surface of the fastener to prevent interference between the fastener and the wall of the bore, which has the effect of preventing radial stresses from being generated in the bore.

The value of the diameter $\varnothing_{final}$ is chosen so that the field of stresses generated covers the diameter of the material taken out enough during the boring so as not to engender a loss of fatigue life in the metal part.

FIG. 3 shows a second embodiment of the disclosed embodiments in which an expansion tool 6 is used to generate a field of residual stresses locally in the metal part 1.

In this embodiment, before the expansion step, it is necessary to make a first hole in the metal part with a diameter $\varnothing_1$ adapted to the diameter of a burnisher 6 used as the expansion tool, that is, the diameter $\varnothing_1$ must be slightly less than the diameter of a part located on the end of the burnisher 6, so that its passage into the hole of the metal part creates stresses there. Moreover, the diameter of the burnisher and the diameter of the first hole are less than the diameter $\varnothing_2$ of the second hole in the composite part, so that the passage of the expansion tool through the second hole does not generate any stresses.

This second embodiment shows the two parts 1, 2 in the initial state (1), each having a hole with an initial diameter $\varnothing_0$.

In (2), a bore is made in the second hole 3 so that its diameter $\varnothing_2$ is approximately greater than the diameter $\varnothing_b$ of the burnisher 6, so that when the burnisher goes through the second hole, it cannot cause any stress within the volume of the composite part.

In (3), the bore in the metal part is prepared for expansion by means of a conventional boring tool 13 that makes it possible to obtain a diameter $\varnothing_1$ adapted for the expansion step.

In a variation of this second embodiment, it is possible to reverse the order in which steps (2) and (3) are performed.

Advantageously, before going ahead and boring the second hole in step (2), it is possible to put a block made out of a material different from the part materials between the metal part and the composite part. The function of this block is to show the boring tool the limit not to exceed on the side of the composite part. This block will be removed for the following steps in the process.

The expansion step shown in (4) in FIG. 3 consists of pushing the burnisher 6 through the first and second holes. Since the burnisher has a diameter greater than the diameter $\varnothing_1$ of the first hole and less than the diameter $\varnothing_2$ of the second hole, it then exerts mechanical action through strain-hardening on the inner wall of the first hole, thus creating a field of residual stresses on the periphery of the first hole, while widening until it obtains an expansion diameter $\varnothing_{exp}$.

In the last step (5), the final boring of the first hole 11 and the second hole 3 is done so that the diameters of the first hole and the second hole are perfectly aligned and equal to receive a fastener with an approximately constant cross section.

FIG. 4 shows a third embodiment of the disclosed embodiments in which the expansion tool used is a laser beam.

As in the case of the other two embodiments, the diameter of the beam must be less than the diameter $\emptyset_2$ in order not to expand the composite part when the laser beam passes through the second hole.

In this third embodiment, the two parts 1, 2 in the initial state (1) each have a hole with an initial diameter $\emptyset_0$.

In (2), the second hole 3 is bored so that its diameter $\emptyset_2$ is approximately greater than the diameter $\emptyset_b$ of the laser beam, so that the passage of the laser beam through the second hole cannot cause stress within the volume of the composite part.

The expansion action shown in FIG. 4 in (3) consists of sending at least one laser beam onto the wall of the first hole. Scanning the laser beam over at least one part of the surface of the wall of the first hole exerts a strain-hardening action similar to that of the burnisher on the inner wall of the first hole and generates a field of residual stress on the surface of the bore.

Advantageously, in this third embodiment of the disclosed embodiments, it is possible to adapt the firing parameters of the laser as a function of the initial diameter $\emptyset_0$ of the second hole so that the oversizing step (2) is optional. Notably, it is possible to have the diameter of the laser beam vary, and the value of the solid angle of its projection to adapt it to the diameter of the second hole so as not to damage it. An example of laser firing conditions is the following: the wavelength of the laser beam is around 1 μm, with energy of 28 J for 25 ns.

Figure 5:
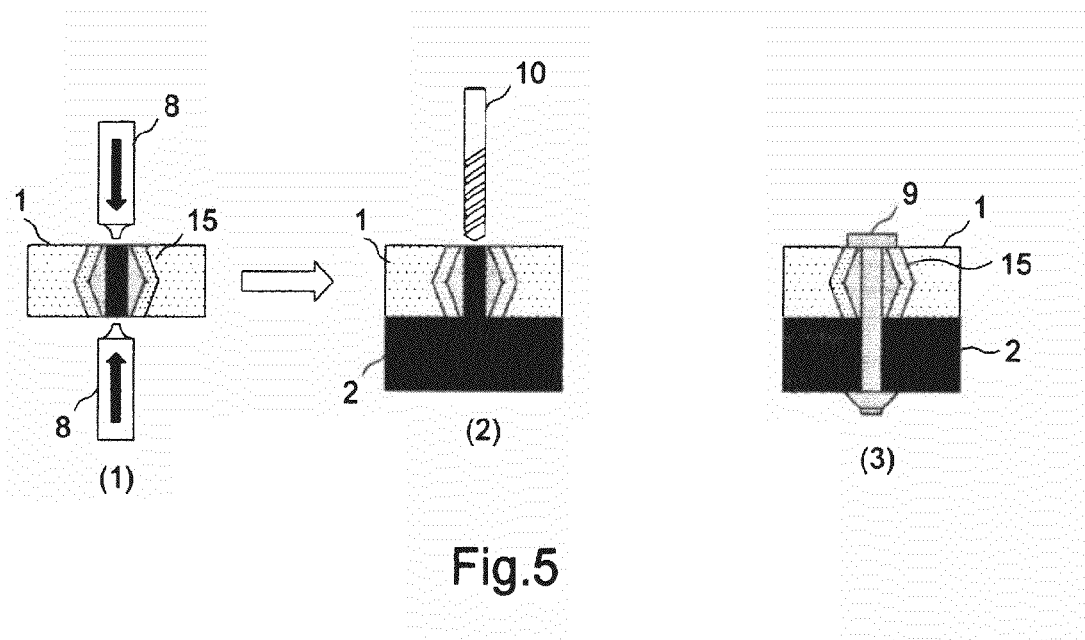
FIG. 5: an assembly process for a metal part and a composite part according to a fourth embodiment of the disclosed embodiments.

FIG. 5 shows a fourth embodiment of the disclosed embodiments in which the metal part is prepared before its positioning with the composite part; the step of creating a field of residual stresses is then done in the absence of the composite part.

In the first step (1), the surface of the metal part is punctured all over the bore area by means of an expansion tool; the area thus expanded can then be marked with the mark of the punch 8 on the outer surfaces of the metal part.

In a second step, the bore is made in the two parts in a single step by means of a boring tool 10. Preferably, the boring starts from the face of the metal part, in the direction of the metal part toward the composite part into the expanded area so as to make a hole precisely in the center of the expanded area, i.e., precisely in the center of the field of stresses created 15 in Step (2).

In the last step, the fastener 9 is positioned in the bore hole to hold parts 1, 2 together.

The process in the disclosed embodiments makes it possible to create or not create residual stresses locally in the volume of the metal part to increase the fatigue life without damaging the composite part, while allowing great flexibility in the level of the different expansion techniques and the expansion tool without interference with the composite part.

In addition, a single bore in the metal part and in the composite part makes it possible to obtain perfect alignment between the holes of the two parts. This is of particular interest in a case where the parts must be assembled by means of a connecting line.

The final diameter $\emptyset_{final}$ of the holes for the assembly step is chosen so that it is approximately greater than the diameter of the fastener, so as to be compatible with the fastening tolerances for the composite part, without causing local stresses in the composite part. However, it should not be too high, so that the material removed does not cause a loss of effectiveness of the stresses on the fatigue life in the metal part.

The process described above can be used to manufacture any type of aircraft structure or land vehicle with an assembly of at least one composite part and at least one metal part subject to significant mechanical stresses.

The invention claimed is:

1. A process for assembling a part made of metal material and a part made of composite material, with a junction between said parts being made by means of a fastener with an approximately constant cross section that fits into a first hole made in the part made out of metal material and a second hole made in the part made out of composite material, wherein prior to assembling said parts, the process includes:
    an expansion step in which an expansion tool has an outer diameter $\emptyset_b$ greater than a diameter $\emptyset_1$ of said first hole and less than a diameter $\emptyset_2$ of said second hole so as to generate solely a field of compressive stresses on a periphery of said first hole and locally in the material of which the part made of metal material is composed;
    a single boring step to make said first hole and said second hole in order to obtain a diameter $\emptyset_{final}$ approximately greater than the diameter of the fastener so as to leave an interstice between an inner wall of said holes and an outer surface of the fastener,
    an assembly step to position the fastener in said holes to hold the metal part and the composite part together.

2. The process according to claim 1, wherein since said expansion tool is a burnisher expansion tool, the process includes:
    placing the part made of metal material against the part made of composite material,
    making said second hole in the part made of composite material having a diameter $\emptyset_2$ approximately greater than the outer diameter $\emptyset_b$ of the expansion tool, in order to allow the burnisher to pass through without generating any stresses on a periphery of said second hole,
    making a first hole in the metal part facing said second hole, with said first hole having a diameter $\emptyset_1$ approximately less than the diameter of the expansion tool, so that a passage of said tool in said hole generates the field of stresses on a periphery of the hole by exerting mechanical action through strain-hardening on an inner wall of the hole,
    passing said tool into said holes,
    performing the boring step in said first expanded hole and in said second hole to obtain a first hole and a second hole having the same final diameter $\emptyset_{final}$,
    performing the assembly step by positioning the fastener.

3. The process according to claim 2, wherein a boring block is placed between the metal part and the composite part whose function is to indicate the boring limit of a boring tool before the boring step for the second hole, with said block then being withdrawn for the final boring step and the assembly step.

4. The process in claim 2, wherein said expansion tool has a part with a diameter $\emptyset_b$ approximately greater than the diameter $\emptyset_2$.

5. The assembly process according to claim 1, wherein since said expansion tool is a laser beam, said process includes:
    placing the part made of metal material against the part made of composite material,
    making said second hole in the part made of composite material having a diameter $\emptyset_2$ approximately greater than the diameter $\emptyset_b$ of the laser beam to allow the laser beam to pass without generating stresses on a periphery of said second hole, making a first hole in the part made of metal material, with the diameter of said hole $Ø_1$ approximately greater than the diameter $Ø_2$ of the part made of composite material, sending a laser beam into said first hole on both sides of the part made of metal material, with said beam having a diameter less than the diameter $Ø_2$ of the hole in the composite material; scanning the laser beam over at least part of surfaces of an inner wall of the hole makes it possible to exert a strain-hardening action in said hole, generating the field of stresses on a periphery of said first hole and locally in the material of which the metal part is composed, performing the boring step in said first expanded hole and in said second hole to obtain a first hole and a second hole with the same final diameter $Ø_{final}$, performing the assembly step by positioning the fastener.

6. The process according to claim 1, wherein the fastener is a bolt or a screw.

7. The use of the process according to claim 1 to manufacture an aircraft structure by assembling at least one part made of composite material and at least one part made of metal material by means of a fastener.

* * * * *